United States Patent
Wan et al.

(10) Patent No.: US 8,279,887 B2
(45) Date of Patent: Oct. 2, 2012

(54) SELECTION OF RADIO RESOURCES IN A RADIO COMMUNICATIONS NETWORK

(75) Inventors: Lei Wan, Beijing (CN); Magnus Almgren, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 666 days.

(21) Appl. No.: 12/093,295

(22) PCT Filed: Nov. 9, 2005

(86) PCT No.: PCT/SE2005/001681
§ 371 (c)(1),
(2), (4) Date: Apr. 30, 2009

(87) PCT Pub. No.: WO2007/055619
PCT Pub. Date: May 18, 2007

(65) Prior Publication Data
US 2010/0029292 A1    Feb. 4, 2010

(51) Int. Cl.
*H04W 72/00* (2009.01)
*H04W 72/06* (2009.01)

(52) U.S. Cl. ..................... 370/437; 455/452.2

(58) Field of Classification Search .......... 455/434–455, 455/161.1, 161.3; 370/328–338
See application file for complete search history.

(56) References Cited

U.S. PATENT DOCUMENTS

| | | | |
|---|---|---|---|
| 5,557,639 A * | 9/1996 | Heikkila et al. | ............... 375/224 |
| 7,200,177 B2 | 4/2007 | Miyoshi | |
| 2001/0014607 A1* | 8/2001 | Furukawa et al. | ............ 455/436 |
| 2004/0009783 A1 | 1/2004 | Miyoshi | |
| 2004/0219883 A1* | 11/2004 | Pauli et al. | .................. 455/67.11 |
| 2005/0105589 A1* | 5/2005 | Sung et al. | ..................... 375/130 |
| 2006/0140313 A1* | 6/2006 | Futami et al. | .................. 375/343 |
| 2006/0198450 A1 | 9/2006 | Cheng et al. | |
| 2007/0047431 A1 | 3/2007 | Nishio et al. | |
| 2008/0132184 A1* | 6/2008 | Wan et al. | .................. 455/115.1 |

FOREIGN PATENT DOCUMENTS
WO    WO 03075523 A1    9/2003

OTHER PUBLICATIONS
S. Tsai and A. Soong, "Effective-SNR Mapping for Modeling Frame Error Rates in Multiple-state Channels." 3RD Generation Partnership Project 2 "3GPP2." 3GPP2-C30-20030429-010, Apr. 2003.*

* cited by examiner

*Primary Examiner* — Ajit Patel
*Assistant Examiner* — Erica Navar (57) ABSTRACT

The present invention relates to a method and apparatus for selecting radio resources for transmission of data over a radio link to which at least two resource units have been allocated. At least one resource unit is selected out of the allocated resource units, wherein the selection is determined in dependence of the result of checking whether values of a quality measure of the allocated resource units fall within a certain range.

11 Claims, 6 Drawing Sheets

SELECTION OF RADIO RESOURCES IN A RADIO COMMUNICATIONS NETWORK

FIELD OF THE INVENTION

The present invention relates to mobile radio communication in general, and in particular to the selecting of resource units for the transmission of information over of a radio link.

BACKGROUND

Radio bandwidth is a scarce resource, and how to efficiently utilize the available radio resources is a general concern in mobile radio communications.

In a multi-carrier, multi-slot system such as an Orthogonal Frequency Division Access (OFDM) system, the radio resources available to the system are divided into resource units, also referred to as chunks. A radio link within such a system can be scheduled to simultaneously transmit on more than one resource unit.

SUMMARY

A problem to which the present invention relates is how to improve the bandwidth utilization within a mobile radio communications system.

This problem is addressed by a method of selecting radio resources for transmission of data over a radio link to which a set of resource units comprising at least two resource units have been allocated. The method comprises: checking whether values of a quality measure of the allocated resource units fall within a certain range; and selecting at least one resource unit out of the set of resource units, wherein the selecting is performed in dependence of the result of said checking.

Hereby is achieved that a sub-set of the allocated resource units may be selected for trans-mission in a manner so that the resulting throughput of information is higher than if all the allocated resource units would have been used for transmission.

The checking advantageously comprises determining, in relation to a resource unit, a value of a function which depends non-linearly of the signal-to-interference-and-noise ratio of the resource unit. By using a non-linear function of the signal-to-interference-and-noise ratio in the checking, the method can successfully be applied to different sets having widely varying signal-to-interference-and-noise ratio distributions when values of the signal-to-interference-and-noise ratio of the resource units is known. The values of the non-linear function can either be the values of the quality measure, or can be used to determine at least one boundary of the range.

In one embodiment of this aspect, the non-linear function is the received coded bit information rate. By using the received coded bit information rate as the non-linear function, simulations show that the span of the range can be constant and hence independent of the signal-to-interference-and-noise ratio distribution within the set of allocated resource units. Furthermore, the usage of the received coded bit information rate yields a low sensitivity of the method to incorrect channel quality estimations. In other words, the method when using the received coded bit information rate as the non-linear function provides adequate resource unit selection even if there is an error in the channel quality estimation.

In a second embodiment of this aspect of the invention, the non-linear function is a measure of throughput of information of a resource unit. The throughput of information is closely linked to the quality of the radio link experienced by an end-user, and hence, the value of the non-linear function in this embodiment suitably reflects the quality of service that the end-user will experience.

In one aspect of the invention, the method further comprises: determining a uniform transmission power for the selected resource units; and setting the transmission power of the at least one selected resource unit to the uniform transmission power. Hereby is achieved that the computational complexity of the selection process is kept low.

In another aspect of the invention, the method further comprises: checking whether a requirement of the radio link is fulfilled by the selected resource units; and, if not, altering a link adaptation for at least one of the resource units in the set. The steps of selecting and checking are then repeated. In this aspect of the invention, the selection process can be repeated, with the modulation and/or coding scheme of the resource units being adjusted between repetitions, until a selection of resource units having appropriate modulation/coding schemes can be identified in a manner so that the selected resource units fulfil a requirement which is set on the radio link.

In one aspect of the invention, the step of selecting comprises determining a value of a second quality measure for the allocated resource units. In this aspect, the selecting is performed in dependence of the values of the second quality measure and in dependence of the number of determined values of the first quality measure falling within the certain range. Hereby is achieved that a suitable number of resource units to be used for transmission can be accurately determined in a manner which is not sensitive to the distribution of channel quality within the set, and then the actual resource units to be transmitted can be selected based on a quality measure which adequately reflects the quality of service perceived by an end-user.

In another aspect of the invention, the step of checking comprises: identifying a most favourable value of the quality measure among the determined values of the quality measure; and setting a lower boundary of the range to a value obtained by subtracting, from the most favourable value, a term defining the acceptable difference between the value of the quality measure and the most favourable value of the quality measure. Hereby is achieved an easy way of adopting the range to the requirements of the distribution of quality measure values within the set of allocated resource units.

In one embodiment of this aspect, the term has a value which depends on the distribution of signal-to-interference-and-noise ratio values of the resource units in the set. In another embodiment, the term has a constant value. Having a constant value of the term provides a simple and computation efficient way of determining the range, whereas by letting the term depend on the quality of the resource units within the set, the resource units for trans-mission can be selected in a manner so that the information transmission rate can be higher.

The problem is further addressed by a computer program product for executing the inventive method, and by an apparatus for selecting radio resources for transmission of data over a radio link to which at least two resource units have been allocated. The apparatus comprises: quality measure determination means arranged to determine a value of a quality measure which depends non-linearly of a signal-to-interference-and-noise ratio of a resource unit; and selection means arranged to select at least one resource unit out of the allocated resource units in dependence of quality measure values of the allocated resource units determined by the quality determination means. The apparatus can advantageously be implemented in a radio base station.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
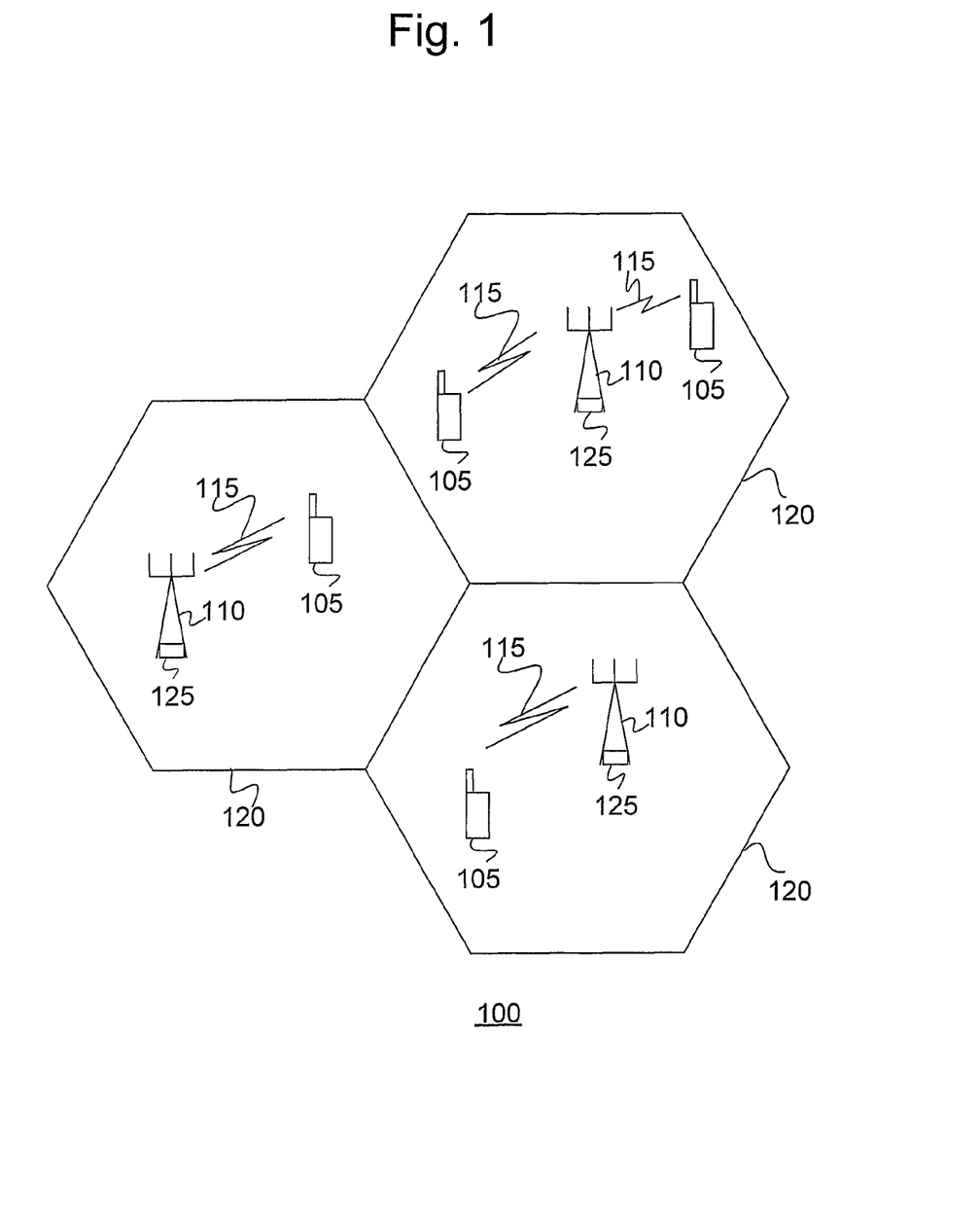
FIG. 1 schematically illustrates a mobile radio communications system.

A mobile radio communications system 100 is schematically illustrated in FIG. 1. A mobile station 105 can communicate with a radio base station over a radio link 115. The radio base stations 110 are connected to a core network, which is not shown in the figure. A geo-graphical area served by a radio base station 110 is often referred to as a cell 120.

A radio link 115 can typically be used for voice calls, as well as for data transfer sessions. In the following, calls, as well as data transfer sessions, will be referred to as sessions.

Figure 2:
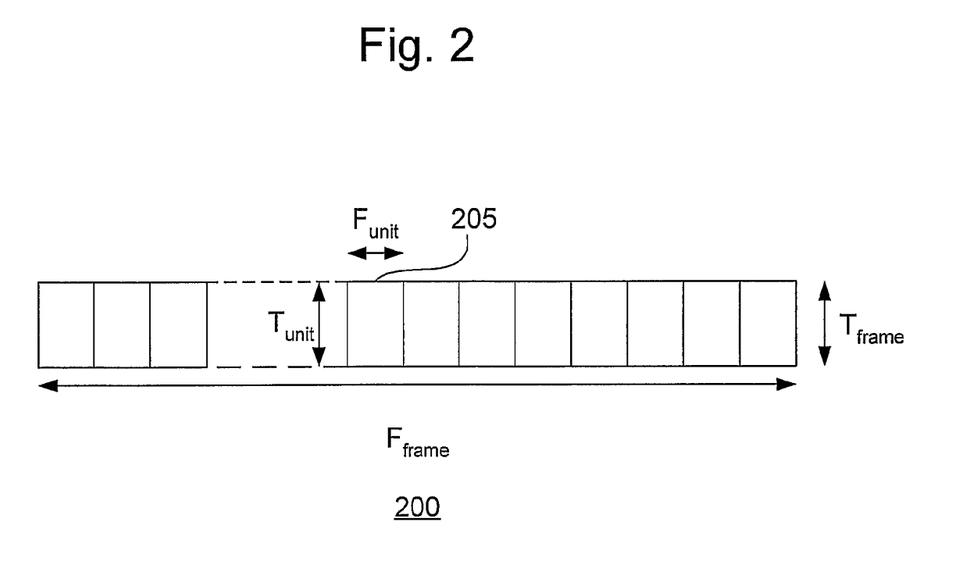
FIG. 2 illustrates a time frame comprising a number of resource units.

Radio resources available for communication between a radio base station 110 and mobile terminals 105 are often divided into a plurality of resource units. A resource unit is the smallest unit which can be allocated to a radio link 115 and is often the smallest unit for which the transmission format is constant. In FIG. 2, the concept of resource units is illustrated for a system 100 operating according to Time and Frequency Division Multiple Access (TD/FDMA). A time frame 200 of a radio link 115 is illustrated to have a time duration $T_{frame}$ and a frequency span $F_{frame}$. The time frame 200 of FIG. 2 is illustrated to consist of a plurality of resource units 205, each having a time duration $T_{unit} = T_{frame}$ and a bandwidth $F_{unit} = F_{frame}/N$, where N is the number of resource units 205 of time frame 200. Resource units 205 which use the same frequency band but occur in different time frames 200 will in the following be referred to as a channel. In some systems, the resource units 205 can be assigned to a radio link 115 on a per-time-frame basis, and the resource units 205 scheduled to the same radio link 115 in different time frames 200 often belong to different channels 210.

The example provided by FIG. 2 is an example of how a time frame 200 in a system 100 based on frequency division multiple access could be divided into resource units 205. In a system 100 based on other ways of providing multiple access, a resource unit 205 could be defined by other quantities. In a system 100 based on code division multiple access, for example, a resource unit 205 could be defined by the quantities time and spreading code. In the following, for purposes of illustration only, the invention will be described in terms of a system 100 operating according to time and frequency division multiple access.

In some mobile radio communication systems 100, a radio link 115 can be scheduled to simultaneously transmit on more than one resource unit 205. Furthermore, there is often an upper limit to the total power that can be transmitted over a radio link 115. The total power transmitted over a radio link 115 can be allocated to the different resource units 205 of the radio link 115 in different ways. For example, a uniform power allocation, in which the transmission power level of each radio resource available to a radio link is the same, can be used. However, with a uniform power allocation, the capacity of the radio resources of high quality is not optimally utilised. Since the radio quality differs between different resource units, it may be advantageous to transmit at different power levels on different resource units, in order to best utilize the transmission capacity of the radio resources that have been allocated to the radio link in the scheduling process.

According to the invention, all the resource units 205 that have been allocated to a radio link 115 in the scheduling process are not necessarily used for transmission, but the transmission power of some of the resource units 205 for which the transmission conditions are less favourable may be set to zero. The resource units 205 to be used for the transmission over a radio link 115, i.e. the resource units 205 to which a non-zero transmission power should be allocated, can preferably be selected in dependence of a quality measure (QM) of the resource units 205 that have been allocated to the radio link 115. A range of the quality measure, hereinafter referred to as the QM-range, could be defined according to the distribution of the values of the quality measure of the allocated resource units 205. The QM-range can be defined in a manner such that the number of resource units 205 having a value of the quality measure QM falling within the QM-range represents the preferred number of resource units 205 to be used for transmission. Such a QM-range, determining the number K of resource units 205 that should be used for transmission, could advantageously be based on a recently obtained, or instantaneous, quality measure of the channel to which the resource unit 205 belongs (or on the statistics distribution of the quality measure). The selection of the K resource units that should be used for transmission could then be based on the respective values of the quality measure QM used in the definition of the QM-range for the available resource units 205, or be based on the respective values of a different quality measure.

The selected resource units 205 could advantageously be transmitting at a uniform power level, where the uniform power level for transmission is preferably selected in a manner so that the total power transmitted on the resource units 205 of a radio link 115 equals the maximum power level for the radio link 115. By allocating the same power level to all selected resource units 205, the power allocation is made computationally simple and fast. However, the power allocated to a selected resource unit 205 could in another embodiment depend on the value of the quality of the resource unit 205, so that the most favourable resource unit 205 transmits at the highest power level, and so forth. Other ways of allocating transmission power to the selected resource units 20 may also be used.

A QM-range could be defined in terms of a threshold of the quality measure, $QM_{thres}$. The number of resource units 205 having a value of the quality measure higher than $QM_{thres}$ would be the number K representing the number of resource units 205 that should be selected for transmission. $QM_{thres}$ could for example be defined in terms of the value of the quality measure of the allocated resource unit 205 having the highest value of the quality measure, $QM_{max}$, and a term $\Delta_{QM}$ defining the maximum difference between $QM_{max}$ and the value of the quality measure of a resource unit 205 in order for the quality measure of the resource unit 205 to fall within the QM-range, yielding the following QM-range:

$$[QM_{max}-\Delta_{QM}; QM_{max}] \qquad (1)$$

In one implementation of this aspect of the invention, the value of the term $\Delta_{QM}$ stays constant and does not depend on the distribution of the values of the quality measure of the resource units 205 that are available to the radio link 115. However, $\Delta_{QM}$ could alternatively take a new value each time the selection of resource units 205 is performed, and could for example be a function of the signal-to-interference-and-noise ratio distribution of the resource units 205 which are available to the radio link 115. Simulations have shown that the relationship between $QM_{max}$ and $\Delta_{QM}$ is not necessarily a monotonous function. For example, the value of $\Delta_{QM}$ could depend on the $QM_{max}$ in a manner so that for high and low values of $QM_{max}$, the value of $\Delta_{QM}$ would be lower than for intermediate values of $QM_{max}$. Alternatively, a suitable value of $\Delta_{QM}$ could be obtained by iterations. By iteratively selecting resource units 205 by applying relation (1) to the available resource units 205, and varying $\Delta_{QM}$ between iterations, a value of $\Delta_{QM}$ which yields a selection of resource units 205 that fulfils the transmission requirements at hand may be obtained. In implementations where the value of $\Delta_{QM}$ is adjusted in accordance with the distribution of the values of the quality measures of the available resource units 205, $\Delta_{QM}$ should preferably be selected in a manner so that the number K of resource units 205 having a value of the quality measure falling within the QM-range would yield a higher total transmission resource than if the $\Delta_{QM}$ had been defined such that K+1 resource units 205 had fallen within the QM-range (when having taken the reduction of resource power of each K+1 resource units 205 into account, the reduction due to the restriction of not exceeding a maximum transmission power).

Alternative ways of defining the QM-range could be applied. For example, an open-ended QM-range defined by a minimum value of the quality measure, $QM_{min}$, may be used: $[QM_{min}; \infty)$, or an open ended QM-range defined by using the mean value of the quality measure, $QM_{mean}$: $[QM_{mean}; \infty)$.

Many quality measures are defined in terms of the received signal power, $E_S$, which depends on the transmitted signal power. Hence, in determining the values of the quality measure of the available resource units 205, the same transmitted signal power is assumed for all the resource units 205 in order to render the quality measure values of the different resource units comparable.

The quality measure used in defining the QM-range could for example be a linear function of signal-to-interference-and-noise ratio (or signal-to-noise ratio in an ideal system where no interference occurs), of a resource unit 205. However, the signal-to-interference-and-noise ratio does not map linearly to the quality of service received by the end-user (measured e.g. in terms of throughput). When the QM-range is defined by using a quality measure which is a linear function of the signal-to-interference-and-noise ratio, the optimal QM-range is rather sensitive to the signal-to-interference-and-noise-ratio distribution of the set of allocated resource units 205, and it is generally not possible to determine a linear function, such as the function defined by expression (1), by which an appropriate QM-range can be obtained for a large range of different signal-to-interference-and-noise ratio distributions.

It is therefore generally advantageous to define a QM-range in terms of a quality measure which is a non-linear function of the signal-to-interference-and-noise ratio. Such quality measures could for example be the received coded bit information rate (RBIR), the information throughput (TH), the mutual information (MI) or the Shannon capacity. Other non-linear functions of the signal-to-interference-and-noise ratio may alternatively be used as a quality measure, including functions and combinations of the above mentioned quality measures.

Received Coded Bit Information Rate

According to one embodiment of the invention, the QM-range is defined in terms of the normalized mutual information per coded bit, also referred to as the Received coded Bit Information Rate (RBIR). The received coded bit information rate, RBIR, is a measure of the information transmission efficiency of a resource unit 205 to which a certain modulation scheme is applied, at a certain level of the thermal noise, if the channel was ideal. Numerical studies have shown that RBIR is an efficient quality measure to use when defining the QM-range.

Assuming a modulation and coding scheme wherein the modulation order of a resource unit j is $M_j$, the received coded bit information rate $RBIR_j$ for a resource unit j is defined as:

$$RBIR_j = I(\gamma_j)/M_j \qquad (2)$$

where $I(\gamma_j)$ is the modulated symbol-level mutual information and $\gamma_j$ is the signal-to-noise ratio of the channel to which resource unit j belongs:

$$\gamma_j = (E_s/N_0)_j \qquad (3)$$

where $E_s$ is the received signal power and $N_0$ is the thermal noise. In a non-ideal system, where interference is experienced on the channels, the signal-to-interference-and-noise ratio could be used instead of $\gamma$ for calculating RBIR.

The modulated symbol-level mutual information, $I(\gamma_j)$ for a resource unit j is defined as $$I(\gamma_j) = U_{XY}\left\{\log_2 \frac{P(Y|X,\gamma_j)}{\sum_X P(X)P(Y|X,\gamma_j)}\right\} = \qquad (4)$$

$$= U_X\left\{\int_{Y_R=-\infty}^{+\infty}\int_{Y_I=-\infty}^{+\infty} P(Y|X,\gamma_j) \cdot \log_2 \frac{P(Y|X,\gamma_j)}{\sum_X P(X)P(Y|X,\gamma_j)} dY_I dY_R\right\},$$

where the modulated symbol X belongs to a certain modulation constellation, and the received symbol $Y=(Y_R+i*Y_I)\in C$, where C is the set of complex numbers. In Equation (4), P(X) is the a-priori probability of X. $P(Y|X, \gamma_j)$ is the probability density function of Y conditioned on transmit symbol X and parameterized by the signal-to-noise ratio $\gamma_j$. $U_X$ is the mean value of $I(\gamma)$ for a given distribution of X, and $U_{XY}$ is the mean value of $I(\gamma)$ for a given distribution of X and Y.

In accordance with relation (1), a threshold defining the QM-range based on the received coded bit information rate, RBIR, could for example be expressed as:

$$RBIR_{thres} = RBIR_{max} - \Delta_{RBIR} \qquad (5)$$

where $RBIR_{max}$ is the RBIR of the resource unit 205 having the highest RBIR of the resource units 205 that are available to the radio link 115, and $\Delta_{RBIR}$ is a term defining the acceptable difference between $RBIR_j$ of a transmitting resource unit j and $RBIR_{max}$ in order for the RBIR-value of the resource unit j to fall within the QM-range. Hence, the QM-range could be expressed by use of the RBIR threshold, $RBIR_{thres}$, which has to be exceeded by the RBIR of a resource unit 205 in order for the resource unit 205 to be fall within the QM-range:

$$[RBIR_{max} - \Delta_{RBIR}; RBIR_{max}] \quad (6)$$

Alternative ways of defining the QM-range in this embodiment could be applied. For example, a criterion by which it is checked whether the RBIR of a resource unit 205 exceeds a constant value may be used, or a criterion defined in a manner so that the RBIR-value of all resource units 205 having an RBIR-value exceeding the mean value of the RBIR-values of the available resource units 205 would fall within the QM-range.

Figure 3:
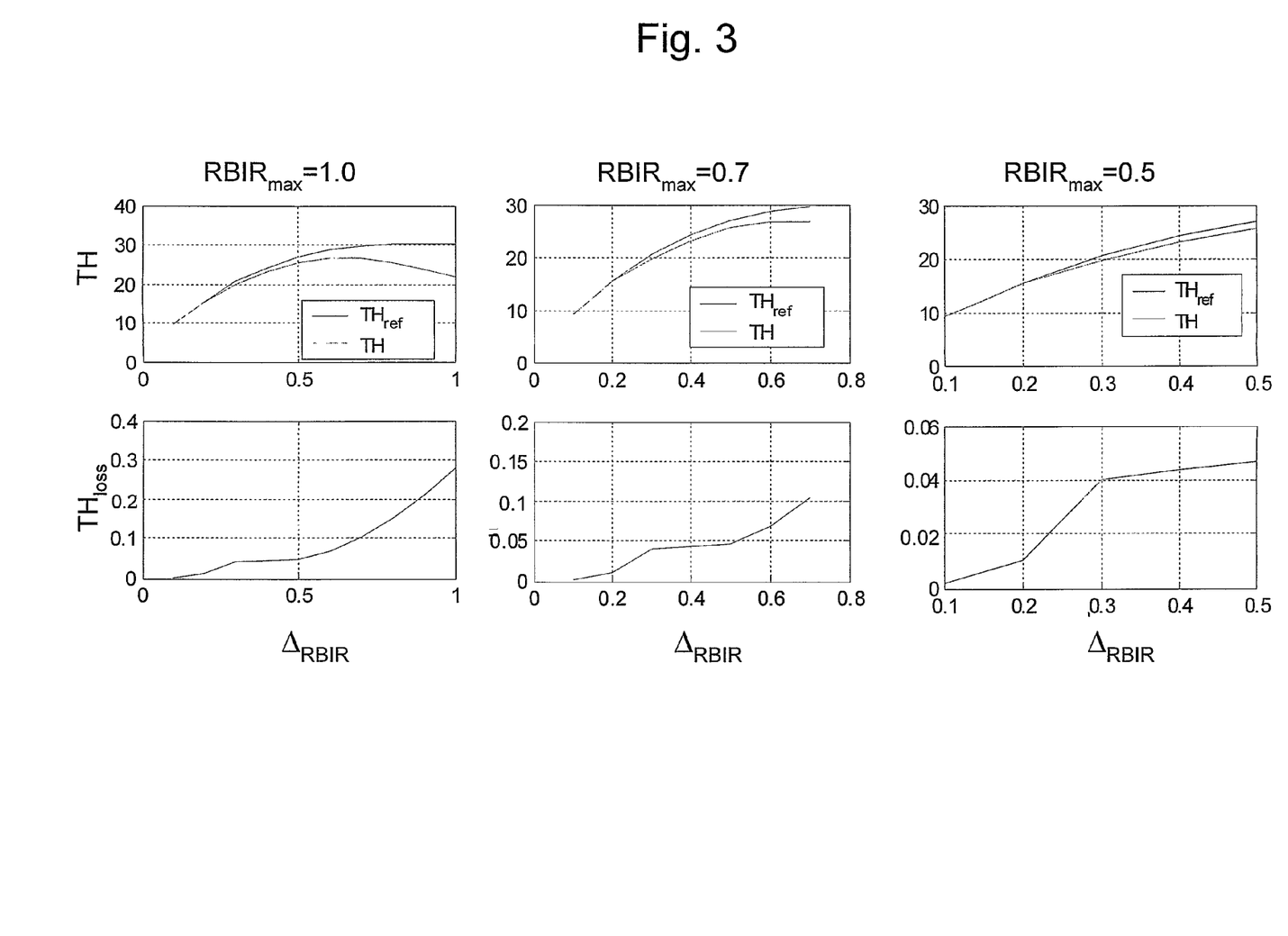
FIG. 3 show the throughput and throughput loss as a function of $\Delta_{RBIR}$ obtained by numerical studies of three different distributions of resource units.

Numerical studies show that a constant value of $\Delta_{RBIR}$ in expression (6) gives good results for a large span of resource unit distributions. FIG. 3 illustrates numerical results obtained by obtained by using a constant value of $\Delta_{RBIR}$ on a uniform distribution of RBIR in the range [0; $RBIR_{max}$], and by selecting the resource units 205 having an RBIR value falling within a QM-range as defined in expression (6) as the transmitting resource units 205. In FIG. 3, the throughput TH (top graphs) as well as the throughput loss $TH_{loss}$ (bottom graphs) are illustrated as a function of $\Delta_{RBIR}$ for three different distributions of resource units 205 having $RBIR_{max}$ values of 1.0 (left-most graphs), 0.7 (middle graphs), and 0.5 (right-most graphs), respectively. The throughput, TH, and the throughput loss, $TH_{loss}$, are defined as follows:

$$TH = M \cdot C \cdot (1 - BLEP) \quad (7)$$

$$TH_{loss} = 1 - \frac{TH}{TH_{ref}}, \quad (8)$$

where M is the modulation order, C is the code rate, BLEP is the Block Error Probability, and $TH_{ref}$ is a reference throughput if perfect link adaptation had been applied. In FIG. 3, $TH_{ref}$ as well as TH are shown as a function of $\Delta_{RBIR}$, where $TH_{ref}$ is the higher value. A single value of the modulation order and code rate was used within the resource unit distribution in order to obtain TH, whereas the modulation order and code rate was adapted individually for each resource unit in order to obtain $TH_{ref}$.

As can be seen from FIG. 3, the $TH_{loss}$ is less than 5% within the $\Delta_{RBIR}$ range of [0; 0.5] for all three different resource unit distributions, and a single value of modulation order and code rate give sufficiently good TH-values of within this range. The numerical studies have shown a value of $\Delta_{RBIR}$ within the range [0.3; 0.5] to be advantageous, with values within the range [0.3; 0.4] yielding particularly good results. Hence, a constant value of $\Delta_{RBIR}$ within this range would give good results for a large range of signal-to-interference-and-noise ratio distributions of the set of allocated resource units 205. However, other constant values of $\Delta_{RBIR}$ may alternatively be used, or $\Delta_{RBIR}$ could alternatively take a new value each time the selection of resource units 205 is performed, as is further discussed in relation to expression (1).

Numerical studies of the usage of RBIR as a quality measure by which a QM-range can be defined shows that the method gives good results even when the quality estimation of the channel is not perfect and the available value of the signal-to-noise ratio γ is a poor approximation of the real value of γ. This is the case also when the value of $\Delta_{RBIR}$ is constant (independent of the signal-to-noise-ratio distribution of the resource units 205). Hence, the method of selecting resource units 205 for transmission is robust in terms of errors in the channel estimation.

Rather than using the equation (4), a value of the modulated symbol-level mutual information $I(\gamma_i)$ can alternatively be obtained by use of an approximation of equation (4). Equation (4) can be approximated in a number of ways, of which some are presented below. An example of an approximate expression that can be used to obtain a value of $I(\gamma_i)$ is given by expression (7), which is based on the Union Chernoff bound for coded transmission:

$$I(\gamma_i) \approx (1 - e^{-\gamma_i/\gamma_m}) \cdot \log_2 M \quad (9)$$

where $\gamma_m$ is the modulation adjusting factor for a given constellation and M is the modulation order.

Other approximations of equation (4) can for instance be based on the Binary Phase Shift Keying (BPSK) cutoff rate:

$$I(\gamma_i) \approx (1 - \log_2(1 + e^{-\gamma_i/2})) \cdot \log_2 M \quad (10)$$

or on the unified Shannon information theory, i.e. the Additive White Gaussian Noise (AWGN) capacity with real Gaussian inputs:

$$I(\gamma_i) \approx \frac{1}{2} \log_2(1 + \gamma_i) \quad (11)$$

Still other approximations of the modulated symbol-level mutual information may be used, such as for example:

$$I(\gamma_i) \approx (1 - e^{-\gamma_i/\alpha})^\beta \cdot \log_2 M \quad (12)$$

where $(\alpha, \beta)$ is the modulation compensation exponent for a given constellation.

When using RBIR as the quality measure for determining the number of resource units 205 to use for transmission, the signal-to-interference-and-noise ratio, γ, is preferably measured in a conventional manner for the allocated resource units 205, and the RBIR value is then obtained from this measurement by use of expression (2) in combination with any one of expressions (4) or (9-12).

Throughput

Another non-linear function of the signal-to-interference-and-noise ratio which could be used in determining a QM-range is the throughput of information at the output of the decoder, TH. The throughput, TH, is defined as follows:

$$TH = M \cdot C \cdot (1 - BLEP), \quad (13)$$

where M is the modulation order, C is the code rate and BLEP is the instantaneous Block Error Probability. As discussed in relation to expression (1), the QM-range can be defined by using a throughput threshold, $TH_{thres}$, so that any resource unit 205 providing a through-put which is higher than $TH_{thres}$ would fall within the QM-range (assuming the same transmission power for all resource units 205 so that the respective throughput values are comparable). The throughput threshold can be defined in terms of the maximum through-put-value of the available resource units 205, $TH_{max}$, and a term $\Delta_{th}$, as discussed in relation to expression (1), where $\Delta_{th}$ is either constant or obtained in dependence of the distribution of the throughput-values of the available resource units 205. The QM-range would then be $[TH_{max}; TH_{max} - \Delta_{th}]$. Alternatively, a QM-range could be defined in terms of the mean value of the throughput-values of the available resources.

In determining an valid value of the throughput of the radio resources 205, the signal-to-interference-and-noise ratio of the available radio resources 205 does not have to be explicitly determined, but the throughput can be determined by measuring the block error probability BLEP, as can be seen from expression (13).

Shannon Capacity

The Shannon Capacity Yet is yet another quality measure which depends non-linearly of the signal-to-noise ratio and which can be used in determining the QM-range and hence how many resource units 205 that should be used for transmission. The Shannon capacity is the upper limit of the demodulation capacity, assuming AWGN modulation and without counting any coding loss. The Shannon capacity, $C_{Shannon}$, is expressed as $C_{Shannon}=\log(1+\gamma)$.

Signal-to-Interference-and-Noise Ratio

Yet another function of the signal-to-interference-and-noise ratio which can be used as a quality measure is the Signal-to-Interference-and-Noise Ratio (SINR) itself:

$$SINR = \frac{E_s}{I+N_0}, \quad (14)$$

where $E_s$ is the received signal power, I is the experienced interference on the channel, and $N_0$ is the thermal noise. As discussed in relation to expression (1), a QM-range can be defined in terms of a SINR threshold, $SINR_{thres}$. $SINR_{thres}$ can be defined in terms of the maximum SINR among the SINR-values of the available channels, $SINR_{max}$, and a term $\Delta_{SINR}$ defining the maximum acceptable difference between $SINR_{max}$ and the SINR-value of a resource unit 205 for the resource unit 205 to fall within the QM-range. However, as discussed above, when the QM-range is defined by using a quality measure which is a linear function of the signal-to-interference-and-noise ratio, the optimal QM-range is rather sensitive to the signal-to-noise-ratio distribution of the set of allocated resource units 205. When SINR is used as the quality measure, it would therefore be advantageous to determine the QM-range in a non-linear fashion in dependence of the signal-to-noise-ratio distribution. The upper and lower limits of the QM-range could e.g. be determined by use of the RBIR or throughput values of the available set of resource units 205, and the available resource units 205 having a SINR value falling within the thus determined QM-range could be selected as the transmitting resource units 205.

A value of SINR can be obtained for each resource unit 205 in a conventional manner by measuring the signal strength, the strength of the interfering channels and the thermal noise.

As discussed above, the QM-range is used according to the invention in order to determine how many resource units 205, out of the resource units 205 that have been allocated to a radio link 115, should actually be used for transmission. When the number K of transmitting resource units 205 has been determined, the selection of the K resource units 205 that should be used is performed. In one embodiment, the K resource units 205 to be used for transmission are selected in dependence of a second quality measure, so that the K resource units 205 having the most advantageous value of the second quality measure would be selected. The second quality measure could be any quality measure. In one example of this embodiment, the QM-range could be defined by use of RBIR, and the selection of the K resource units 205 could be performed in dependence of the signal-to-interference-and-noise ratio, of the resource units 205. Hence, in this example, the number K of transmitting resource units is determined by calculating the RBIR values of all the available resource units 205 (assuming a particular coding and modulation mode, which may or may not be the same for all resource units 205), and by checking how many of the calculated RBIR values fall within the QM range. The K resource units 205 having the highest signal-to-interference-and-noise ratio are then selected for transmission.

In another embodiment of the invention, the K resource units 205 having a quality measure which falls within the QM-range are selected for transmission. In this embodiment, the step of determining the number K of transmitting resources 205 and the step of selecting the transmitting resources 205 could be performed simultaneously, and the number K would not have to be explicitly determined.

Figure 4:
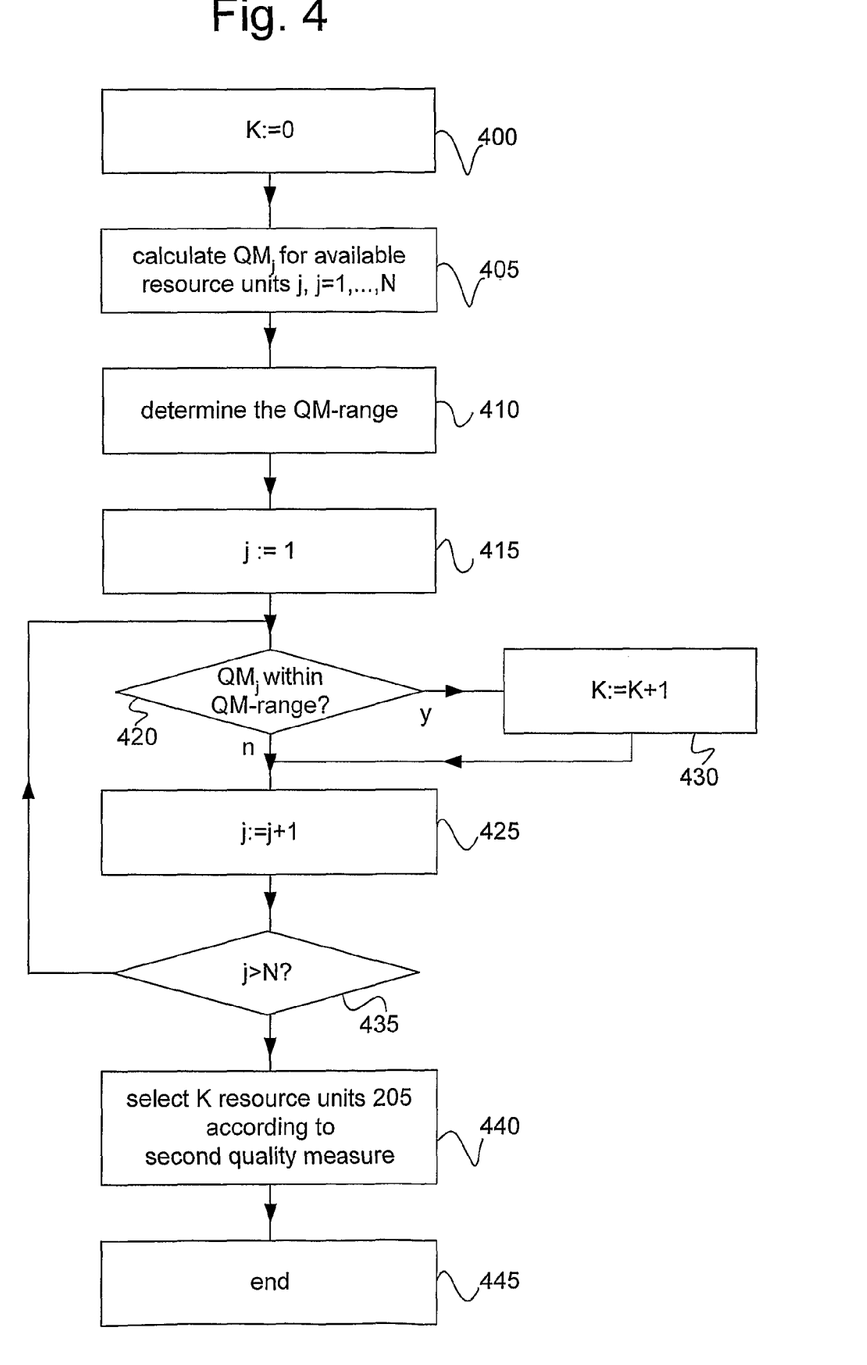
FIG. 4 is a flowchart schematically illustrating the inventive method of selecting resource units for transmission.

The flowchart of FIG. 4 illustrates an exemplary implementation of the inventive method. In step 400, a counter K, representing the number of resource units having a value of the quality measure QM falling within the QM-range, is set to zero. In step 405, the quality measure QM used to define the QM-range is calculated for all available resource units 205, so that a set of values $QM_j$ is obtained, j=1, ... N, where N is the number of available resource units 205. In step 410, the QM-range is determined. This can preferably be done in dependence of the QM-values calculated in step 405, but could also be done independently of the QM-values determined in step 405. In step 415, a counter j is set to 1. Step 420 is then entered, in which it is checked whether $QM_j$ falls within the QM-range. If not, step 425 is entered, in which the counter j is incremented by 1. However, if $QM_j$ falls within the QM-range, step 430 is entered, in which the counter K is incremented by 1. Step 425 is then entered. In step 435, it is checked whether the counter j has exceeded the value N. If not, step 420 is re-entered. If it is found in step 435 that j is larger than N, i.e. that the check of step 420 has been performed for all available resource units 205, then step 440 is entered, in which K resource units are selected for transmission. The selection of K resource units is performed in dependence of a second quality measure, so that the K resource units 205 having the most favourable value of the second quality measure are selected. The second quality measure may equal the first quality measure, or may be a different quality measure. When the second quality measure equals the first quality measure, the counter K can be dispensed with, as will be seen in relation to FIGS. 5 and 6.

As is shown above, the QM-range can be defined in terms of any measure of quality of the resource units 205. However, in relation to FIGS. 5 and 6, for purposes of illustration only, it will be assumed that the QM-range is expressed in terms of RBIR. Furthermore, it is assumed that the resource units 205 selected for transmission are the resource units 205 having an RBIR value falling within the QM-range.

Figure 5:
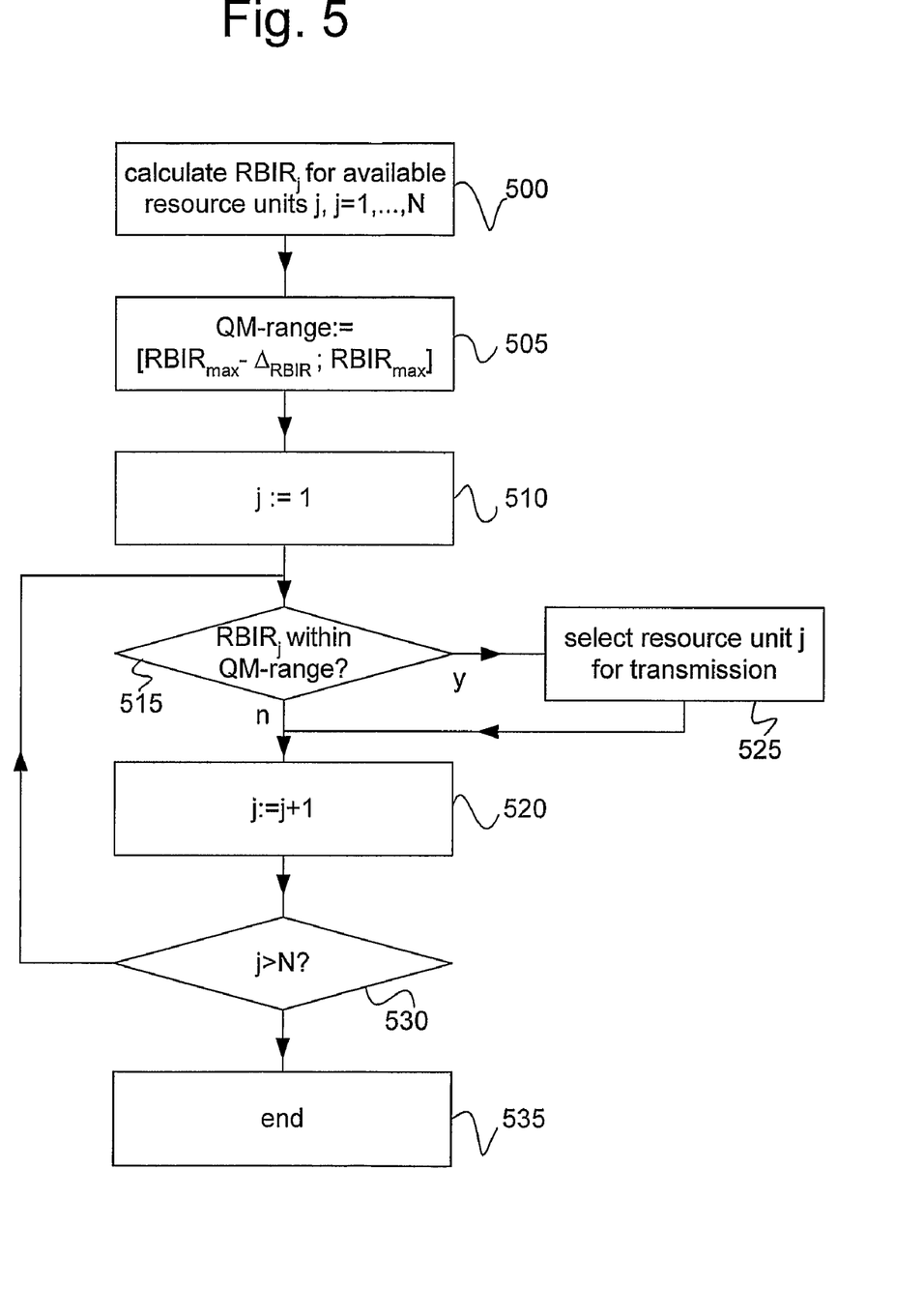
FIG. 5 is a flowchart schematically illustrating an embodiment of the invention in which RBIR is used for determining the QM-range and for selecting the selecting resource units for transmission.

FIG. 5 is a flowchart which schematically illustrates the inventive method when applied to a radio link 115. In FIG. 5, it is assumed that the modulation and coding schemes of the different resource units 205 have already been determined. Furthermore, the transmission power of different resource units 205 has been set to a uniform value in order to allow a comparison of the respective RBIR values. In the example of FIG. 5, the QM-range is determined by use of expression (6), and $\Delta_{RBIR}$ is a constant that does not depend on the RBIR values of the radio resources that are available to the radio link 115. In step 500, a value of RBIR, $RBIR_j$, is calculated for N resource units j available to the radio link 115, where j takes the values 1, ..., N. In step 505, the QM-range is determined, by identifying the maximum $RBIR_j$, $RBIR_{max}$, of the $RBIR_j$ values calculated in step 500. $RBIR_{max}$ is used as the upper limit of the QM-range, and $RBIR_{max}$ minus the term $\Delta_{RBIR}$ is used as the lower limit. In step 510, a counter j is set to 1. In step 515, it is checked whether $RBIR_j$ falls within the QM-range. If not, step 520 is entered, in which the counter is incremented by 1. However, if it is found in step 515 that RBIR$_j$ falls within the QM-range, then resource unit j is selected for transmission in step 525. Step 520 is then entered. In step 530, it is checked whether the counter j is larger than N. If so, the process is ended in step 535. If not, step 515 is re-entered.

The method illustrated by FIG. 5 is a method of selecting a set of resource units 205 for transmission on a radio link 115 out of a larger set of resource units 205 available for transmission on the radio link 115, based on a value of the received coded bit information rate, RBIR. The transmission power of the available resource units j which were not selected in step 525 will be set to zero, whereas the transmission power of the resource units j which were selected in step 525 will be set to a non-zero value. In one embodiment of the invention, the transmission power of the selected resource units 205 will be set to a uniform value, so that each transmitting resource unit 205 on the radio link 115 will be transmitting at the same transmission power. This uniform value of the transmission power can preferably be selected in a manner so that the transmission powers of all the selected resource units 205 add up to the maximum allowed transmission power of the radio link 115. In another embodiment of the invention, the transmission power can be allocated to the different resource units 205 in dependence of the different values of RBIR, or in any other manner.

The method of FIG. 5 could be performed in various ways. For example, a step could be introduced in which the resource units 205 are sorted according to the respective values of RBIR. Steps 510 to 530 could then be replaced by a procedure in which the highest RBIR-value which does not fall within the QM-range is identified. All resource units j having a higher RBIR$_j$ could then be selected for transmission.

In the embodiment of the invention illustrated by FIG. 5, the QM-range is defined by use of expression (6). As discussed above, the QM-range can be defined in other ways.

As can be seen in relations 2-9 above, the value of RBIR of a resource unit 205 depends on the modulation mode applied to the resource unit 205. The same applies to other channel quality measures. The throughput of a resource unit 205, for example, depends on the modulation mode and the coding scheme applied to the resource unit 205. The modulation and coding scheme is often adapted to the quality of a radio link 115, in order to ensure correct transmission of information when the quality goes down, and in order to allow for a high information throughput when the quality of the radio link 115 is good. Such adaptation of modulation and/or coding scheme is often referred to as link adaptation.

In the procedure described by FIG. 5, it is assumed that the modulation and coding schemes of the different resource units 205 have already been determined. However, the procedure of FIG. 5 can also be applied in an iterative procedure, in which the modulation and/or coding schemes of the available resource units 205 are varied between iterations, in order to identify a set of resource units 205 for transmission having appropriate transmission link adaptation.

Figure 6:
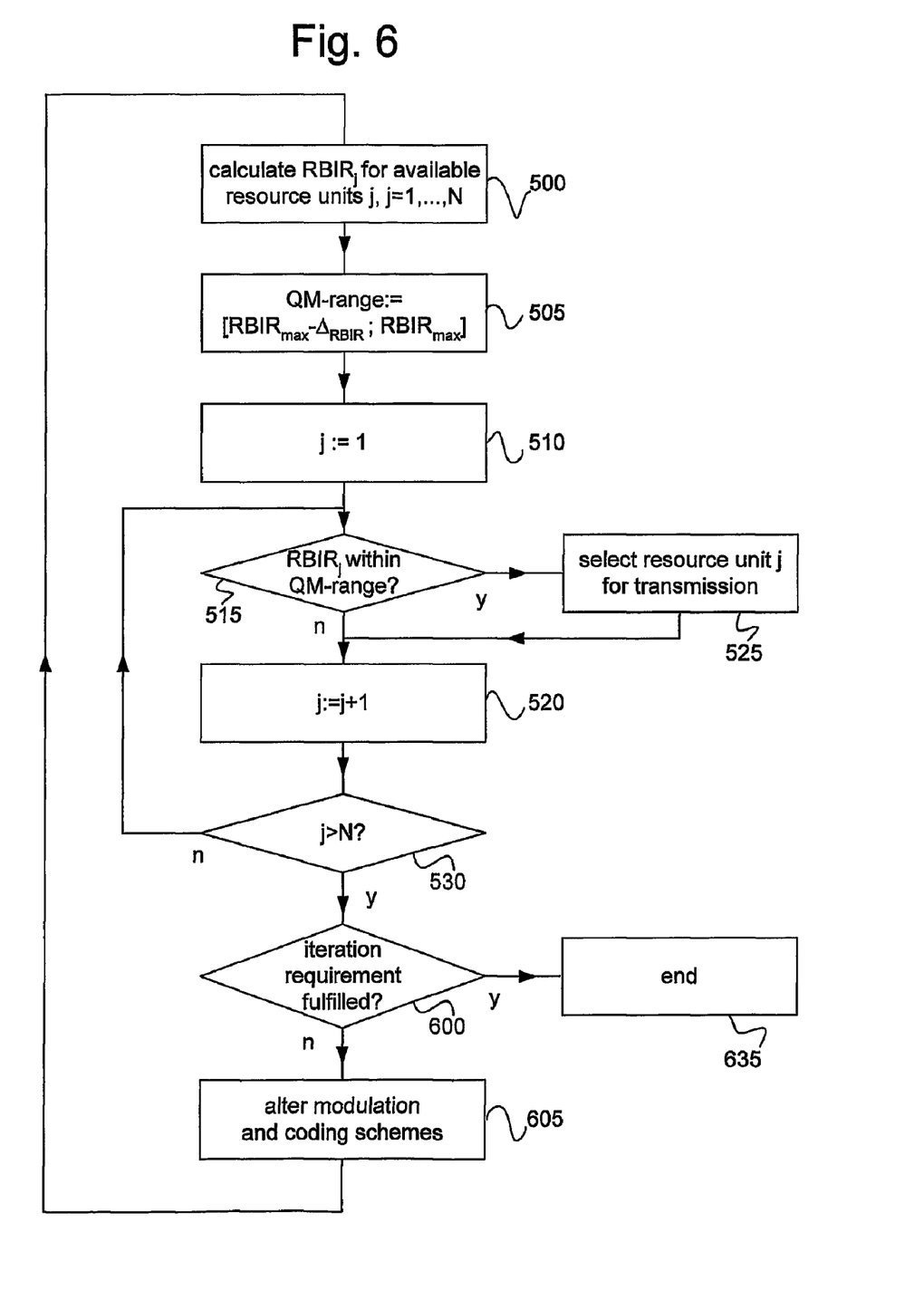
FIG. 6 is a flowchart schematically illustrating an embodiment of an iterative procedure of finding the resource units that should be selected for transmission is illustrated, wherein the modulation and/or coding schemes of the resource units are altered between iterations.

In FIG. 6, a flowchart of an iterative procedure of finding the resource units 205 that should be selected for transmission is illustrated. Steps 500-530 are performed as in the method described in relation to FIG. 5. When all the resource units j having an RBIR$_j$ falling within the QM-range have been identified, step 600 is entered. In step 600, it is checked whether an iteration requirement has been fulfilled. If not, step 605 is entered, in which the modulation and coding schemes of the available resource units 205 are altered. Step 500 is then re-entered. However, if it is found in step 600 that the iteration requirement has been fulfilled, then step 535 is entered, in which the procedure is ended. The resource units 205 selected during the last iteration will then be used for transmission on the radio link 115.

The alteration of the link adaptation of the available resource units performed in step 605 could be performed in different ways. In one embodiment, modulation and/or coding schemes could be altered between iterations in a more or less random fashion, or the new modulation and/or coding schemes to be used in the next iteration could be selected according to a predetermined scheme of selecting modulation and coding schemes. Alternatively, the new modulation and/or coding schemes could be selected in a converging manner, in dependence of how close the previous iteration was from fulfilling the iteration requirement.

The iteration requirement used in step 600 could for example be based on a measure of the information throughput obtained over the radio link 115 if the selected resource units 205 were used for transmission. The iteration requirement could for example be as follows: a measure of the information throughput achieved by use of the resource units 205 selected for transmission should at least exceed an information throughput required by the session transmitted over the radio link 115. In an embodiment in which the new modulation and coding schemes are selected in a converging manner, the iteration requirement could for example be defined as a minimum difference between the information throughput measure between the last two iterations. When using a converging method of selecting the modulation and coding schemes, the iteration requirement could alternatively be defined so that the iteration requirement is fulfilled if there is no difference in the number of resource units 205 having been selected in the last two iterations, or if there is less than a maximum difference between the two sets of resource units 205 selected for transmission in the last two iterations. Other iteration requirements could also be applied: The iterations could for example stop after a certain number of iterations.

The modulation and coding scheme used for the resource units 205 selected for trans-mission could be uniform for all resource units 205, or vary between resource units 205 in accordance with quality measurements of the channels to which the resource units 205 belong. In allowing the modulation and/or coding scheme to vary between resource units 205, the link adaptation can be performed to a greater accuracy for each resource unit 205. However, by using a uniform modulation and coding scheme for resource units 205 that are simultaneously used for transmission over a radio link 115, the computational complexity of the process is decreased.

In the procedures of finding resource units 205 for transmission over a radio link 115 illustrated by FIGS. 5 and 6, the QM-range could for example be defined by expression (6). When the QM-range is determined by use of $\Delta_{RBIR}$, $\Delta_{RBIR}$ could be set to a constant value. Alternatively, an iterative procedure could be used for finding the most favourable $\Delta_{RBIR}$.

The iterative application of link adaptations of FIG. 6 could be applied in any implementation in which the quality measure and/or the QM-range depend on the link adaptation, or, in the case when the number K of transmitting resource units 205 is determined by a first quality measure and the K resource units 205 are selected in dependence of a second quality measure, when either the first quality measure, the QM-range or the second quality measure depends on the link adaptation. If the QM-range does not depend on the link adaptation, step 505 can be omitted from the second and further iterations in FIG. 6. Likewise, if the value of the quality measure used does not depend on the link adaptation, the equivalence of step 500 could be omitted.

The inventive method of selecting resource units for transmission could be used for both the uplink and the downlink part of a radio link 115.

According to the invention, the system 100 comprises a selection apparatus for selecting the resource units 205 which should be used for transmission over a radio link 115 to which at least two resource units 205 have been allocated. The selection apparatus could advantageously be implemented in the radio base stations 110 of system 100. In FIG. 1, the radio base stations 110 are illustrated to comprise a selection apparatus 125. The selection apparatus 125 could alternatively be implemented in a base station controller or similar node, in a relay node located between the mobile station 105 and the radio base station 110, or elsewhere in the system 100. The selection apparatus 125 could be arranged to receive measurements of the channel quality of the available resource units 205, by which values of the quality measure, QM, can be obtained. The selection apparatus 125 could be arranged to received measurements of channel quality of both the uplink and the downlink parts of radio links 115, and could be arranged to select resource units 205 for both the uplink and the downlink parts of a radio link 115. The selection apparatus 125 could advantageously be implemented as software and computer hardware upon which the software can run. A selection apparatus 125 could also be implemented in a mobile station 105. This could be particularly useful in a system 100 where the mobile station 105 could select which channels 210 to use for transmission over a radio link 115.

The invention can advantageously be applied to multi-carrier systems, such as system using orthogonal frequency division access (OFDM), in which a radio link can be allocated more than one (simultaneous) resource unit 205. Examples of such systems are communications systems based on the 3GPP-Long Term Evolution (LTE) standard, the WiMax standard, and the 4G or B3G standards.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A method of selecting radio resources for transmission of data over a radio link to which a set of resource units comprising at least two resource units have been allocated, the method comprising:
    identifying a most favourable received coded bit information rate;
    setting a lower boundary of an acceptable range for received coded bit information rates to a value obtained by subtracting, from the most favourable received coded bit information rate, a term defining an acceptable difference from the most favourable received coded bit information rate;
    determining, for each of one or more resource units (j), a respective received coded bit information rate ($RBIR_j$) based on a modulated symbol-level mutual information value ($I_j$) associated with that resource unit and a modulation order ($M_j$) associated with that resource unit, such that $RBIR_j = I_j/M_j$;
    checking whether the respective received coded bit information rate of one or more resource units falls within the acceptable range; and
    selecting at least one resource unit out of the set of resource units, wherein the selecting is performed in dependence on whether the respective received coded bit information rate for the selected resource unit falls within the acceptable range.

2. The method of claim 1 wherein the received coded bit information rate comprises a first quality measure, and wherein the step of selecting comprises
    determining a value of a second quality measure for the allocated resource units; and
    the selecting is performed in dependence of the values of the second quality measure and in dependence of the number of determined values of the received coded bit information rate falling within the acceptable range.

3. The method of claim 1 further comprising determining a uniform transmission power for the selected resource units; and setting the transmission power of the at least one selected resource unit to the uniform transmission power.

4. The method of claim 1, wherein the term has a value which depends on the distribution of signal-to-interference-and-noise ratio values or the signal-to-noise ratio values of the resource units in the set.

5. The method of claim 1, wherein the term has a value which is independent of the distribution of signal-to-interference-and-noise ratio values of the resource units in the set.

6. The method of claim 5, wherein the term has a constant value in the range of [0.3; 0.5].

7. The method of claim 1, further comprising checking whether a requirement of the radio link is fulfilled by the selected resource units; and, if not, altering a link adaptation for at least one of the resource units in the set; and performing the steps of checking and selecting.

8. A computer program product for selecting radio resources for transmission of data over a radio link to which a set of at least two resource units have been allocated, the computer program product comprising a computer-readable medium encoded with computer program code operable to, when run on computer means, execute the steps of:
    identifying a most favourable received coded bit information rate;
    setting a lower boundary of an acceptable range for received coded bit information rates to a value obtained by subtracting, from the most favourable received coded bit information rate, a term defining an acceptable difference from the most favourable received coded bit information rate;
    determining, for each of one or more resource units (j), a respective received coded bit information rate ($RBIR_j$) based on a modulated symbol-level mutual information value ($I_j$) associated with that resource unit and a modulation order ($M_j$) associated with that resource unit, such that $RBIR_j = I_j/M_j$;
    checking whether the respective received coded bit information rate of one or more resource units falls within the acceptable range; and
    selecting at least one resource unit out of the set of resource units, wherein the selecting is performed in dependence on whether the respective received coded bit information rate for the selected resource unit falls within the acceptable range.

9. An apparatus for selecting radio resources for transmission of data over a radio link to which a set of at least two resource units have been allocated, the apparatus comprising electronic hardware configured to:
    identify a most favourable received coded bit information rate;
    set a lower boundary of an acceptable range for received coded bit information rates to a value obtained by subtracting, from the most favourable received coded bit information rate, a term defining an acceptable difference from the most favourable received coded bit information rate;

determine, for each of one or more resource units (j), a respective received coded bit information rate ($RBIR_j$) based on a modulated symbol-level mutual information value ($I_j$) associated with that resource unit and a modulation order ($M_j$) associated with that resource unit, such that $RBIR_j = I_j/M_j$;

check whether the respective received coded bit information rate of one or more resource units falls within the acceptable range; and select at least one resource unit out of the set of resource units in dependence on whether the respective received coded bit information rate for the selected resource unit falls within the acceptable range.

10. The apparatus of claim 9, wherein the electronic hardware is further configured to:

determine a uniform transmission power for the selected resource units; and set the transmission power of the selected resource units to the uniform transmission power.

11. The apparatus of claim 9, wherein the electronic hardware is further configured to:

check whether a radio link requirement is fulfilled by the selected resource units;

generate a requirement checking result;

alter a link adaptation of at least one of the resource units in the set if the requirement checking result indicates that the requirement is not fulfilled.

* * * * *

UNITED STATES PATENT AND TRADEMARK OFFICE
CERTIFICATE OF CORRECTION

| | | |
|---|---|---|
| PATENT NO. | : 8,279,887 B2 | Page 1 of 1 |
| APPLICATION NO. | : 12/093295 | |
| DATED | : October 2, 2012 | |
| INVENTOR(S) | : Wan et al. | |

It is certified that error appears in the above-identified patent and that said Letters Patent is hereby corrected as shown below:

On the Title Page, in the Figure, delete Tag "635" and insert Tag -- 535 --, therefor.

In the Drawings:

In Fig. 6, Sheet 6 of 6, delete Tag "635" and insert Tag -- 535 --, therefor.

In the Specifications:

In Column 1, Line 37, delete "trans-mission" and insert -- transmission --, therefor.

In Column 2, Line 55, delete "trans-mission" and insert -- transmission --, therefor.

In Column 3, Line 35, delete "geo-graphical" and insert -- geographical --, therefor.

In Column 6, Line 37, delete "as" and insert -- as: --, therefor.

In Column 8, Line 50, delete "through-put" and insert -- throughput --, therefor.

In Column 8, Line 54, delete "through-put-value" and insert -- throughput-value --, therefor.

In Column 9, Line 35, delete "deter-mine" and insert -- determine --, therefor.

In Column 12, Line 38, delete "trans-mission" and insert -- transmission --, therefor.

Signed and Sealed this
Fourth Day of June, 2013

Teresa Stanek Rea
*Acting Director of the United States Patent and Trademark Office*